Dec. 22, 1953          A. L. ARENBERG          2,663,794
VEHICLE LIGHT CONTROLLING LENS PANEL
Filed June 9, 1948
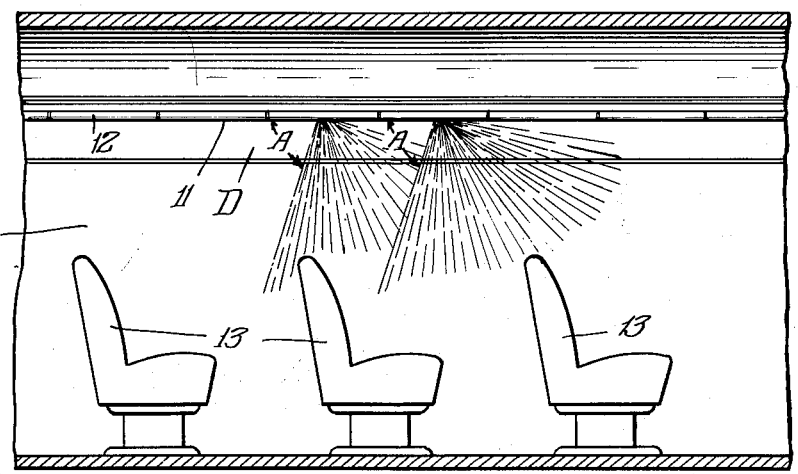
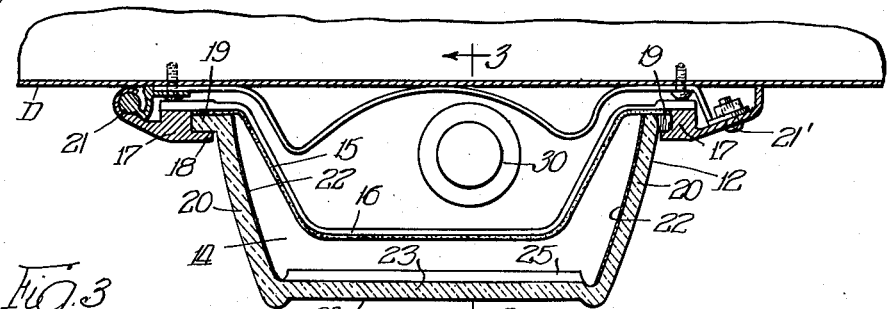
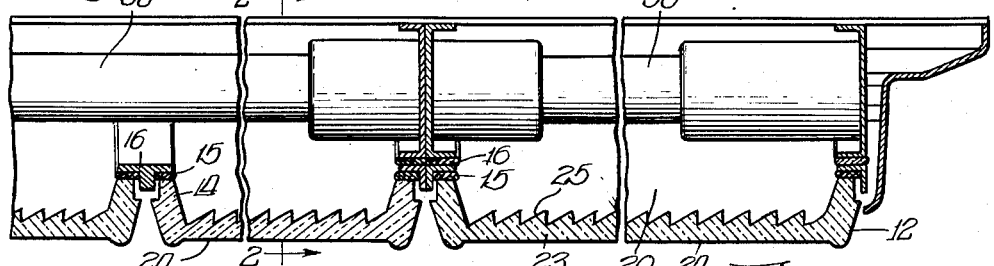
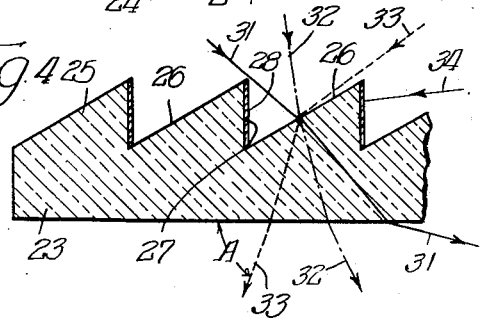
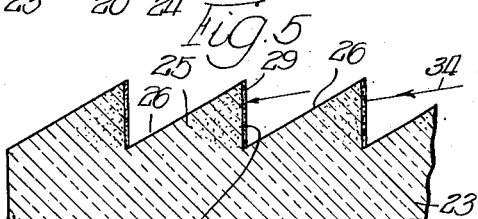
INVENTOR.
Albert L. Arenberg,
BY
Cromwell, Greist + Warden
ATTYS.

Patented Dec. 22, 1953

2,663,794

UNITED STATES PATENT OFFICE 2,663,794

VEHICLE LIGHT CONTROLLING LENS PANEL

Albert L. Arenberg, Highland Park, Ill., assignor to Patent License Corporation, Chicago, Ill., a corporation of Illinois Application June 9, 1948, Serial No. 31,992

1 Claim. (Cl. 240—106)

The present invention relates to improvements in a light control device or system which is intended particularly for installation in passenger vehicles, although it is also applicable to non-vehicular installations.

It is an object of the invention to provide an improved illuminating and light control system or unit in the form of a light transmissive fixture having a transparent, lensed control section which permits direct beams from a source of illumination within said fixture to exit from the latter only at an angle which is outside the normal line of view of an occupant of the space illuminated by the fixture.

A more specific object is to provide a light control system of the foregoing character including an elongated fixture characterized by a plurality of like, transparent panels, each provided with a large number of internal lens elements so arranged as to prevent longitudinal exit of light rays impinging the upper surface of said lens elements through a substantial vertical protection angle in one longitudinal direction, while permitting exit of said rays in the opposite direction throughout an angle represented by 180° minus said protection angle, said lens elements each presenting a further surface at an acute angle to said upper surface which is treated to render it opaque or translucent, thereby to wholly or partially block the remainder of the light which impinges said lens elements.

A still further object is to provide a transparent lensed panel for a lighting fixture of the foregoing character, which panel is adapted to control light emitted from a source in the fashion referred to in the preceding paragraphs.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claim.

In the drawings,

Fig. 1 is a fragmentary, somewhat schematic view in longitudinal vertical section along the center aisle of a passenger vehicle interior, showing the relationship of the fixture to the passenger seats and generally illustrating the functioning of the light control system of which said fixture is a part;

Fig. 2 is an enlarged fragmentary view in transverse vertical section, along a line generally corresponding to line 2—2 of Fig. 3, illustrating the internal lensing arrangement of the fixture;

Fig. 3 is a fragmentary view in longitudinal vertical section along a line generally corresponding to line 3—3 of Fig. 2, further illustrating such details;

Fig. 4 is a greatly enlarged view in vertical longitudinal section, illustrating a special treatment of the internal lens elements of the fixture in accordance with one form of the invention and also indicating the manner in which the fixture functions to control light emission; and Fig. 5 is a view similar to Fig. 4, showing a slightly modified type of lens treatment.

The present invention affords an improved fixture for the overhead illumination of buses, railway cars and like passenger vehicles characterized by fixed passenger seats facing in a common direction longitudinally of the vehicle and, generally, on opposite sides of a center aisle. Previous overhead lighting arrangements for this type of installation have not succeeded in eliminating the objectionable feature of direct glare impinging the eyes of a passenger, within the normal line of sight of the latter. Said glare is represented by the direct viewing of an internal light source or reflector through a portion of the fixture which is necessarily made transparent for the purpose of affording a direct, relatively intense, clear reading beam.

My copending application, Serial No. 31,991, filed June 9, 1948, presents one method of controlling this glare by the use of a transparent panel which is provided with special internal lensing, represented by what may be termed a sawtooth configuration of two different lens surfaces.

The present application involves a lensed fixture which accomplishes glare control by the use of inclined internal lens surfaces which afford a substantial, obtuse, light exit angle forwardly of any given point of light emission from a source, preventing vertical exit throughout a substantial protection angle rearwardly of that point, on the same theory as is involved in the aforesaid application. In addition, further surfaces of the lenses which extend vertically between said inclined surfaces are so treated as to entirely or partially block direct light transmission through the same, thereby completing the control of light from the source. Thus, the normal reading zone of said passenger is flooded with intense direct light from his rear and he is not subject to direct glare from the forward direction unless he raises his line of view substantially above the normal angle.

Reference is made in the following description solely to the adaptation of the fixture to vehicle lighting purposes, however it is evident that the system and fixture are also applicable in many other non-vehicular or structural arrangements, in which a non-diffusive, lensed control of illumination through a transparent panel is desired.

Referring to Fig. 1 of the drawings, the reference numeral 10 designates a vehicle interior, such as that of a passenger bus, railway car or the like, in which the fixture of the invention, generally designated 11, is installed. This fixture is of extremely elongated character, being made up of a plurality of similar, hollow, trough-like, light transmissive panels or sections 12 arranged in end-to-end abutment. Such panels are disposed along and over the row of longitudinally spaced fixed seats 13 on either side of the central aisle of the vehicle, being carried by the ceiling, desk, luggage rack or other appropriate surface of the vehicle. The specific mounting provisions for the panels 12 form no part of the invention, however, I have shown in Figs. 2 and 3 a desirable and practical assembly for this purpose.

As illustrated in those figures, the panels 12 are provided with like, shaped, vertically depressed end walls 14 over which felt or sponge rubber sealing strips 15 are disposed and held in place by transverse metal clamping straps 16. These straps overlie the adjacent end walls 14 of successive panels 12. They are appropriately secured at their opposite ends to the elongated, extruded metal frame members 17. These members have inner ledges 18 which support the longitudinal flanges 19 that extend along the top of the side walls 20 of the hollow panel. Said straps thus clamp the panels 12 to the aforesaid frame member ledges. Frame members 17 may be further braced and held together by provisions, not shown, other than the straps 16. The resultant frame is pivoted to the supporting surface in the vehicle, represented by the ceiling or deck D, by an extruded metal hinge 21. Securing screws 21' spaced along the opposite side of the frame serve to removably hold the parts in the operative position.

The panel 12 is fabricated of a suitable moldable transparent material, for example, glass or one of the well known plastics, such as methyl methacrylate. Its side walls 20 are preferably rendered light-diffusive in character on their inner surface by enameling, etching or otherwise, as indicated by the reference numeral 22. The remainder of the panel, including particularly the lensed bottom section 23 thereof, is entirely transparent in the vertical direction. This section presents a smooth, flat, lower or outer surface 24, and the interior thereof is shaped to provide a multiplicity of lens elements or prisms 25. The present invention primarily resides in the shape and treatment of the surfaces of these prisms, as in the respective alternative embodiments of Figs. 4 and 5.

The prisms 25, in both of said embodiments, have the general form of a plurality of successive, parallel, internal lens surfaces 26 of narrow width which are disposed at an angle of about 30° to the horizontal, although this value may vary somewhat. Surfaces 26 are arranged in succession in the direction longitudinally of the panel 11 and extend parallel to one another across or transversely of the transparent panel section 23. The forward edge of inclined surfaces 26 is defined by a vertical wall or plane 27 which intersects surface 26 at an acute angle. In the form shown in Fig. 4, this wall is treated, for example, by enameling the same throughout its area, to render it opaque, as indicated by by the reference numeral 28. In the embodiment of Fig. 5 the wall 27 is merely made translucent by etching or enameling, as at 29, so as to pass diffused rays.

In the functioning of the fixture, light rays from the usual light source, represented in Figs. 2 and 3 by the elongated fluorescent tubes 30, impinge the lenses 25 from many angles, as shown in Figs. 4 and 5. A light ray, represented by the solid direction line 31, impinges the surface 26 at a substantial forward and downward angle and is refracted in traversing the transparent panel member 23, exiting therefrom at an extremely small angle to the lower surface 24 of the panel. This ray thus constitutes a component of a beam of intense, direct light issuing downwardly and in the forward direction for reading purposes. The direction of another ray is indicated by the dot-dash line 32, undergoing a different degree of refraction, and issuing from the panel at a greater angle to its lower surface 24, but still directed forwardly over the shoulders of passengers therebeneath. The direction of a third and critical ray is indicated by the dotted line 33. It is practically coincident with the plane of lens surface 26, or at an infinitesimally greater angle to the horizontal than said surface. This ray is refracted by the lensing and exits from panel member 23 at an angle A which represents the protection angle of the fixture. Other rays 34 projected from the light source will impinge the vertical wall 27 at the opaque area 28 (of the modification of Fig. 4) or the translucent area 29 (of the modification). They are totally blocked by the former and are transmitted by the latter only in the form of a relatively weak, non-glare, type of diffused light. No intense light from the source 30 exits from surface 24 at less than the protection angle A, which results from the fact that said source may not be viewed directly through any given point on any of the transparent panel sections 23, unless the viewer directs his gaze toward said point at an angle steeper then angle A. The normal line of view is at a far more horizontal angle. This is illustrated in Fig. 1, in which it is seen that occupants of the seats 13 will only be subject to glare in the event that they raise their line of sight parallel to or above the angle represented by protection angle A. The mild diffused illumination through the translucent wall area 29 of Fig. 5 is not objectionable in the slightest, in fact is desirable since it represents an increase in efficiency or total light emission of the fixture, as compared to the embodiment of Fig. 4. Forwardly of angle A the space beneath the fixture 11 is flooded thoroughly from the rear with a relatively intense reading light.

Those skilled in the art will appreciate the possibility of making various alterations in the light transmitting panel, and particularly in the transparent lensed section 23 thereof, without departing from the principles of the present invention. I therefore desire that such modifications be construed within the scope of the present invention, as defined by the appended claim.

I claim:

In a light control fixture, a single elongated, light transmissive panel of hollow one-piece, trough-like, cross-sectional outline adapted to be disposed beneath and parallel to an elongated light source to be directly impinged by light emanating from the latter, said panel including opposed, light diffusive side walls and an intermediate transparent section substantially coextensive in area with that between said walls and adapted to transmit direct light from said source, said section being shaped on its surface adjacent said source to provide a multiplicity of elongated lens elements disposed as a longitudinal series in side-by-side, parallel relation and extending transversely of the length of said panel, said lens elements being uniformly oriented in said series with reference to the panel length, each having a flat surface arranged at an acute angle of substantial size to the plane of said section and being laterally defined at one side by a light diffusive edge wall facing toward said source which is substantially normal to said plane and intersects said surface at an acute angle of substantial size, the surface of said panel opposite said lens elements being smooth.

ALBERT L. ARENBERG.

References Cited in the file of this patent

UNITED STATES PATENTS

| Number | Name | Date |
|---|---|---|
| 755,197 | Wadsworth | Mar. 22, 1904 |
| 1,251,211 | Forger | Dec. 25, 1917 |
| 1,350,277 | Grondahl | Aug. 17, 1920 |
| 2,124,417 | Hamel et al. | July 19, 1938 |
| 2,232,276 | Schepnoes | Feb. 18, 1941 |
| 2,277,563 | Scott et al. | Mar. 24, 1942 |
| 2,352,804 | Schepnoes | July 4, 1944 |
| 2,372,874 | Zimmerman | Apr. 3, 1945 |
| 2,434,049 | Nordquist | Jan. 6, 1948 |

FOREIGN PATENTS

| Number | Country | Date |
|---|---|---|
| 11,054 | Great Britain | Oct. 22, 1908 |